United States Patent
Maikhuri et al.

(10) Patent No.: US 11,843,549 B1
(45) Date of Patent: Dec. 12, 2023

(54) AUTOMATED RESOURCE PRIORITIZATION USING ARTIFICIAL INTELLIGENCE TECHNIQUES

(71) Applicant: Dell Products L.P., Round Rock, TX (US)

(72) Inventors: Ajay Maikhuri, Bangalore (IN); Shibi Panikkar, Bangalore (IN); Dhilip Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/107,262

(22) Filed: Feb. 8, 2023

(51) Int. Cl.
*H04L 47/70* (2022.01)
*H04L 41/16* (2022.01)
*H04L 47/80* (2022.01)

(52) U.S. Cl.
CPC ............ *H04L 47/821* (2013.01); *H04L 41/16* (2013.01); *H04L 47/808* (2013.01)

(58) Field of Classification Search
CPC ...... H04L 47/821; H04L 41/16; H04L 47/808
See application file for complete search history.

(56) References Cited

U.S. PATENT DOCUMENTS

| 5,432,887 A * | 7/1995 | Khaw | G06N 3/042 706/19 |
| 7,346,520 B2 * | 3/2008 | Etzioni | G06Q 10/06 705/400 |
| 9,172,738 B1 | 10/2015 | da Costa | |
| 10,574,591 B1 * | 2/2020 | Houston | H04L 67/1001 |
| 10,878,354 B1 * | 12/2020 | Zbikowski | G06Q 10/06315 |
| 10,878,468 B2 | 12/2020 | Sasa | |
| 2002/0169681 A1 * | 11/2002 | Vincent | G06Q 30/06 705/26.81 |
| 2004/0167827 A1 * | 8/2004 | Vincent | G06Q 30/06 705/26.81 |
| 2013/0268403 A1 * | 10/2013 | Psota | G06Q 10/083 705/26.35 |

(Continued)

FOREIGN PATENT DOCUMENTS

WO WO-2011085360 A1 * 7/2011 ............ G06Q 10/10

*Primary Examiner* — Oanh Duong
(74) *Attorney, Agent, or Firm* — Ryan, Mason & Lewis, LLP (57) ABSTRACT

Methods, apparatus, and processor-readable storage media for automated resource prioritization using artificial intelligence techniques are provided herein. An example computer-implemented method includes obtaining information pertaining to one or more user transactions, each user transaction involving one or more resources; obtaining information associated with the one or more resources, including resource demand-related information, resource supply-related information, and resource build-related information; prioritizing, in connection with one or more resource-related actions, the one or more user transactions and/or the one or more resources by processing, using one or more artificial intelligence techniques, at least a portion of the information pertaining to the one or more user transactions and at least a portion of the information associated with the one or more resources; and performing at least one automated action based at least in part on the prioritizing of the one or more user transactions and/or the one or more resources.

20 Claims, 7 Drawing Sheets

(56) References Cited

U.S. PATENT DOCUMENTS

| | | | |
|---|---|---|---|
| 2014/0258032 A1* | 9/2014 | Psota | G06Q 30/0609 |
| | | | 705/26.35 |
| 2015/0106578 A1* | 4/2015 | Warfield | G06F 3/0653 |
| | | | 711/158 |
| 2018/0302340 A1* | 10/2018 | Alvarez Callau | H04L 47/821 |
| 2021/0133930 A1* | 5/2021 | Dinh | G06V 20/46 |
| 2022/0084035 A1* | 3/2022 | Baltsan | G06Q 40/04 |

* cited by examiner

AUTOMATED RESOURCE PRIORITIZATION USING ARTIFICIAL INTELLIGENCE TECHNIQUES

FIELD

The field relates generally to information processing systems, and more particularly to techniques for resource management in such systems.

BACKGROUND

In many enterprise contexts, large and/or bulk transactions can place stress on resources that have been allocated and/or planned for other transactions. Additionally, subscription-based transactions can provide further challenges related to the costs being carried by providing enterprises. However, conventional resource management techniques lack end-to-end visibility into supply chain planning and execution, which can result in errors with respect to delivery date commitments, leading to user dissatisfaction and increased costs.

SUMMARY

Illustrative embodiments of the disclosure provide techniques for automated resource prioritization using artificial intelligence techniques.

An exemplary computer-implemented method includes obtaining information pertaining to one or more user transactions, each user transaction involving one or more resources, and obtaining information associated with the one or more resources, wherein the information associated with the one or more resources includes resource demand-related information, resource supply-related information, and resource build-related information. The method also includes prioritizing, in connection with one or more resource-related actions, at least one of the one or more user transactions and the one or more resources by processing, using one or more artificial intelligence techniques, at least a portion of the information pertaining to the one or more user transactions and at least a portion of the information associated with the one or more resources. Additionally, the method includes performing at least one automated action based at least in part on the prioritizing of at least one of the one or more user transactions and the one or more resources.

Illustrative embodiments can provide significant advantages relative to conventional resource management techniques. For example, problems associated with user dissatisfaction and increased costs are overcome in one or more embodiments through automatically prioritizing resources in connection with one or more resource-related actions using artificial intelligence techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
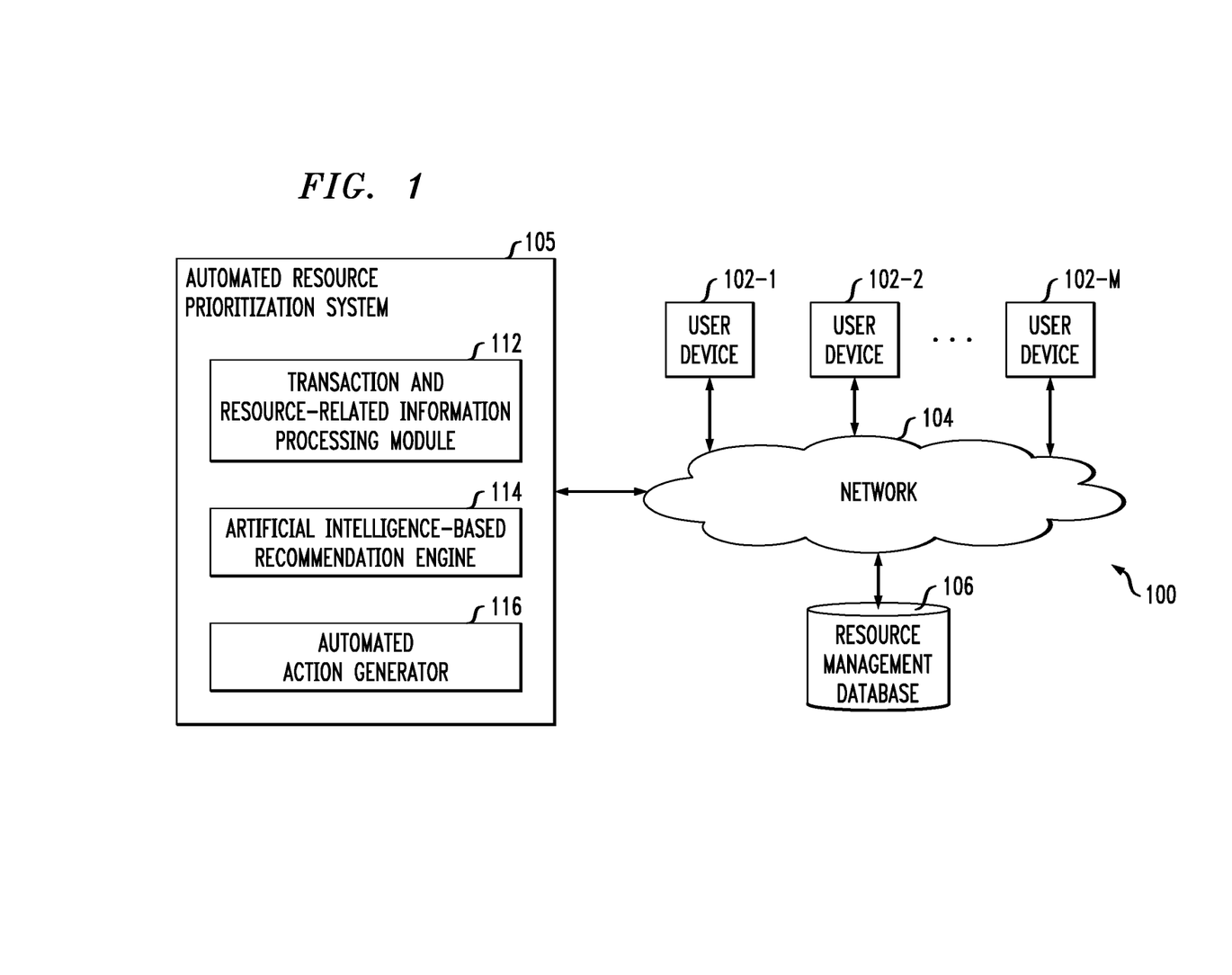
FIG. 1 shows an information processing system configured for automated resource prioritization using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated resource prioritization system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated resource prioritization system 105 can have an associated resource management database 106 configured to store data pertaining to various resources, which comprise, for example, demand-related information, backlog-related information, build-related information, supplier-related information, materials-related information, region-related information, etc.

The resource management database 106 in the present embodiment is implemented using one or more storage systems associated with automated resource prioritization system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated resource prioritization system 105 are one or more input-output devices, which illustratively comprise keyboards, displays or other types of input-output devices in any combination. Such input-output devices can be used, for example, to support one or more user interfaces to automated resource prioritization system 105, as well as to support communication between automated resource prioritization system 105 and other related systems and devices not explicitly shown.

Additionally, automated resource prioritization system 105 in the FIG. 1 embodiment is assumed to be implemented using at least one processing device. Each such processing device generally comprises at least one processor and an associated memory, and implements one or more functional modules for controlling certain features of automated resource prioritization system 105.

More particularly, automated resource prioritization system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated resource prioritization system 105 to communicate over the network 104 with the user devices 102, and illustratively comprises one or more conventional transceivers.

The automated resource prioritization system 105 further comprises a transaction and resource-related information processing module 112, artificial intelligence-based recommendation engine 114, and automated action generator 116.

It is to be appreciated that this particular arrangement of elements 112, 114 and 116 illustrated in the automated resource prioritization system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automated resource scheduling using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated resource prioritization system 105 and resource management database 106 can be on and/or part of the same processing platform.

An exemplary process utilizing elements 112, 114 and 116 of an example automated resource prioritization system 105 in computer network 100 will be described in more detail with reference to the flow diagram of FIG. 6.

Accordingly, at least one embodiment includes automated resource scheduling using artificial intelligence techniques. Such an embodiment includes implementing a platform for at least one user (e.g., an enterprise user such as a sales agent) for processing certain transactions (e.g., large transactions, including transactions involving more than a given quantity of items, transactions involving more than a given amount of revenue, etc.) and simulating one or more supply chain-related preferences (such as, for example, staggered delivery, price options, etc.) in order to negotiate with a user without compromising on profitability, user satisfaction, etc.

As further detailed herein, such an embodiment can include implementing at least one simulation engine to learn a given supply chain's dynamics and recommend one or more execution paths with respect to particular transactions. Such a simulation engine studies the dynamics of one or more supply chains and generates suggestions for carrying out one or more particular transactions. As described herein, in one or more embodiments, such suggestions can include one or more staggered delivery options.

At least one embodiment includes determining and/or developing what-if analysis parameters in connection, for example, with cost and user satisfaction variables. By way merely of example, such an embodiment can include dividing information pertaining to a given transaction (e.g., a quote) based at least in part on a prioritization of the corresponding user's needs and/or objectives. Such divisions can be based, for example, on categories such as the following: extremely critical delivery (which involves the need for prompt delivery to maintain user satisfaction with minimal profit); medium critical delivery (which involves delivering transaction items within preferred cost ranges and within a medium time horizon (e.g., 30 to 40 days)); and low critical delivery (which involves delivering transaction items within a longer time horizon (e.g., within a quarter) while maximizing profitability).

Figure 2:
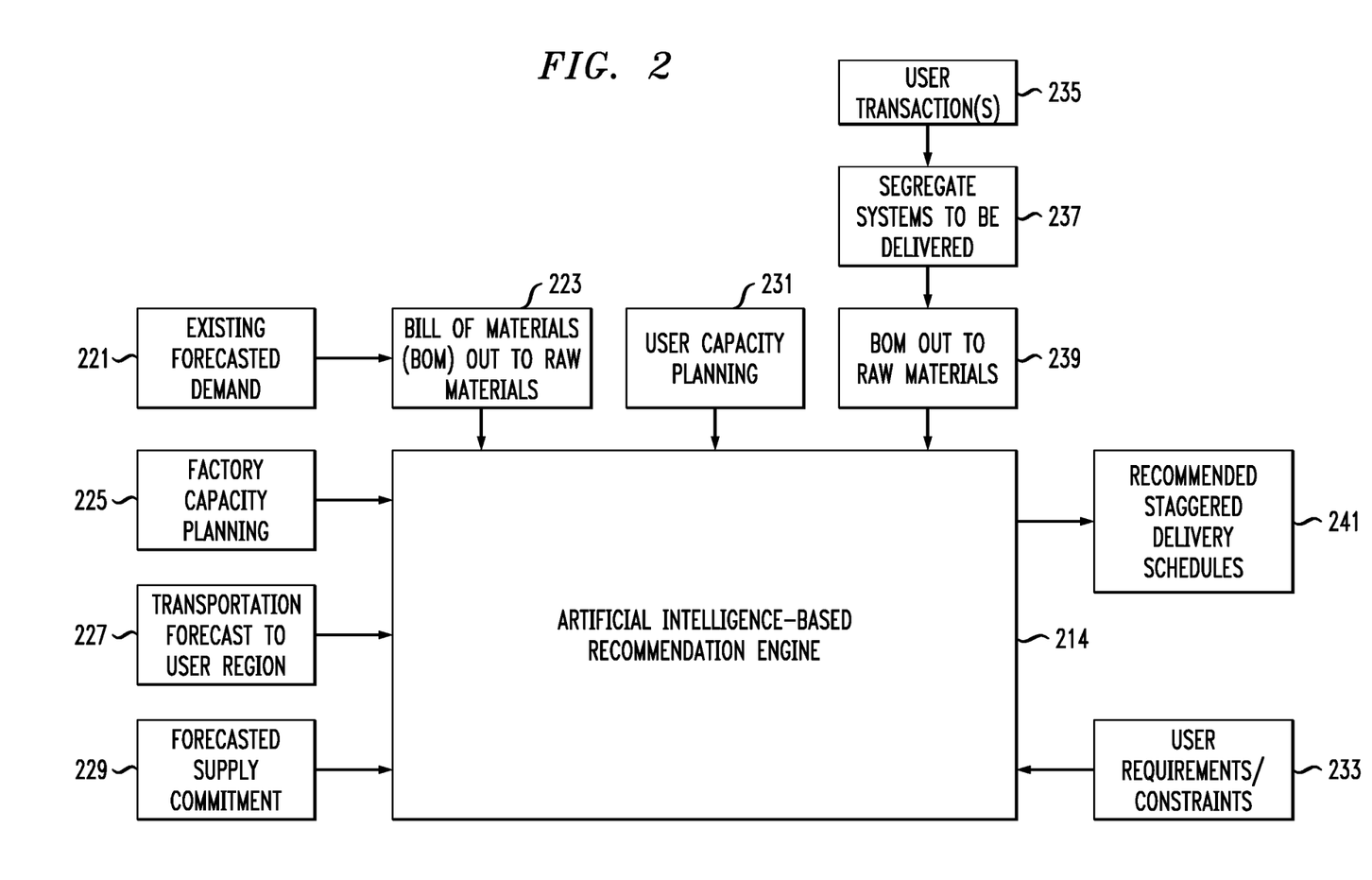
FIG. 2 shows an example workflow in connection with a recommendation engine for automated resource scheduling in an illustrative embodiment.

FIG. 2 shows an example workflow in connection with a recommendation engine for automated resource scheduling in an illustrative embodiment. By way of illustration, FIG. 2 depicts artificial intelligence-based recommendation engine 214 that generates and/or provides one or more forecasted views of scheduling resource-related actions in connection with at least one particular transaction (e.g., recommended staggered delivery schedules 241 for a transaction of a given size), including one or more temporal intervals based at least in part on related cost information, one or more user requirements and/or constraints 233, and/or information pertaining to user readiness in connection with at least a portion of the relevant resources.

As further detailed herein, at least one embodiment includes implementing one or more forecasting mechanisms for parameters including, for example, existing forecasted resource demand 221 (which can be used in determining bill of materials (BOM) out to raw materials 223), manufacturing and/or factory capacity planning 225, forecasting supply commitments 229, and logistics planning and/or transportation forecast to user region(s) 227. Accordingly, in such an embodiment, artificial intelligence-based recommendation engine 214 can process such inputs in connection with one or more additional steps.

Such steps can include dividing at least one given user transaction 235 into different categories (e.g., storage-related, hyper converged infrastructure-related (HCI-related), laptop-related, network-related, etc.) via step 237, and BOM out to raw materials 239 can be determined in connection therewith. For each category, capacity planning information 231 attributed to the user can be applied in conjunction therewith to determine and/or estimate temporal-based requirements for one or more resource components associated with the given transaction (e.g., yearly requirements (for example, memory requirements, storage requirements, etc.) of each of one or more devices). Based at least in part on such determinations and/or estimates, a first resource-related action (e.g., a first delivery constituting a first portion of the transaction resources) can be scheduled in accordance with capacity planning for a given duration (e.g., the first year's capacity components).

At least one embodiment can also include generating a predicted supply chain (e.g., demand supply) view for different intervals and/or durations, and allowing simulation in accordance therewith. Such simulations can be implemented, for example, to validate the demand and supply match, wherein the demand represents the order(s) awaiting manufacturing, and the supply represents the inventory ready and/or available to be used in manufacturing tasks. Accordingly, a simulation can be used to apply and match one or more deficiencies in inventory and reduce one or more backlogs. Additionally, such simulations can enable the provisioning and/or generation of probable demand and supply information forecasts based at least in part on different resource scheduling options in connection with at least one given transaction.

One or more embodiments also include determining and/or deriving confidence levels (e.g., within a range such as between one and five, with one representing the lowest level of confidence and five representing the highest level of confidence) pertaining to the ability to deliver each of one or more resource components in accordance with different temporal intervals. Such confidence levels can be determined and/or derived, for example, based at least in part on relevant current raw material supply information, existing demand information, and supply commitment information. Additionally, at least one embodiment can include arranging each resource component associated with the given transaction in accordance with confidence level, for example, in descending order with respect to date of delivery. In such an embodiment, resource components having the same confidence level for a given temporal interval can be further arranged based, for example, on corresponding costs (e.g., logistics costs).

Subsequent to and/or in connection with such resource component arranging, one or more embodiments include filtering out one or more options based on one or more user constraints. By way merely of example, consider a use case wherein a user's data center will not be ready until July $17^{th}$. As such, the first resource delivery related thereto should preferably not be carried before July $17^{th}$. Accordingly, subsequent to any such filtering, one or more embodiments can include identifying the top-most item from one or more of the resource component lists and recommending the date(s) corresponding thereto as at least one initial resource delivery date.

At least one embodiment can also include generating at least one visualization which, for example, shows details, derived from the arranging and/or list-generation noted above, for each resource component in one or more formats (e.g., in tabular form). Such details can include, for example, different combinations of resource components (based, e.g., on different durations of user capacity planning information), confidence level(s) for each resource component and/or delivery option related thereto, supply chain-related costs associated with each resource component and/or delivery option related thereto, etc. Such a visualization can enable enterprise agents and/or users (e.g., sales and/or marketing personnel) to modify one or more selections and/or combinations, for example, in connection with discussions with the user. Also, once a sequence of resource-related actions (e.g., deliveries) is determined and/or finalized, raw materials can be reserved for each action (e.g., each shipment) for the related resources, thereby limiting and/or reducing the possibility of issue or delay in manufacturing or supply chain workflows.

With respect to subscription-based supply chain contexts, emphasis is often put on the prioritization of products and/or components. Such prioritization can include, for example, the management of demand streams that are distributed over a variety of geographical areas, wherein different priorities may be attached to different demand streams. Accordingly, one or more embodiments includes determining how to distribute limited resources among competing demands by determining which resources have higher user priorities and which resources are available to meet the demand. As detailed herein, such an embodiment includes balancing and/or considering data pertaining to demand availability and/or readiness (e.g., data related to when users are and/or will be able to utilize given resources), supplier availability (e.g., data related to the availability of resource components), and build availability (e.g., data related to line capacity to manufacture and fulfill demand).

At least one embodiment includes implementing ensemble-based techniques to anticipate resource priority in dynamic situations by utilizing distributed and/or federated machine learning models. Such dynamic situations can include environments with shifting input circumstances and context-based scenarios. As further detailed herein, such an embodiment includes assembling and implementing at least one independent model for managing resources, derived from numerous supply chain providers and/or participants, of a supply chain entity and/or enterprise.

One or more embodiments can also include receiving high priority demand information (e.g., orders), calculating the supply of the related resource(s) for a given temporal period, allocating supplies within the supply allocation duration the given temporal period to determine scheduling information based at least in part on location priority and at least one demand date. Such an embodiment additionally includes generating at least one shipment and/or delivery recommendation for each distributed supply in accordance with the determined scheduling information.

Figure 3:
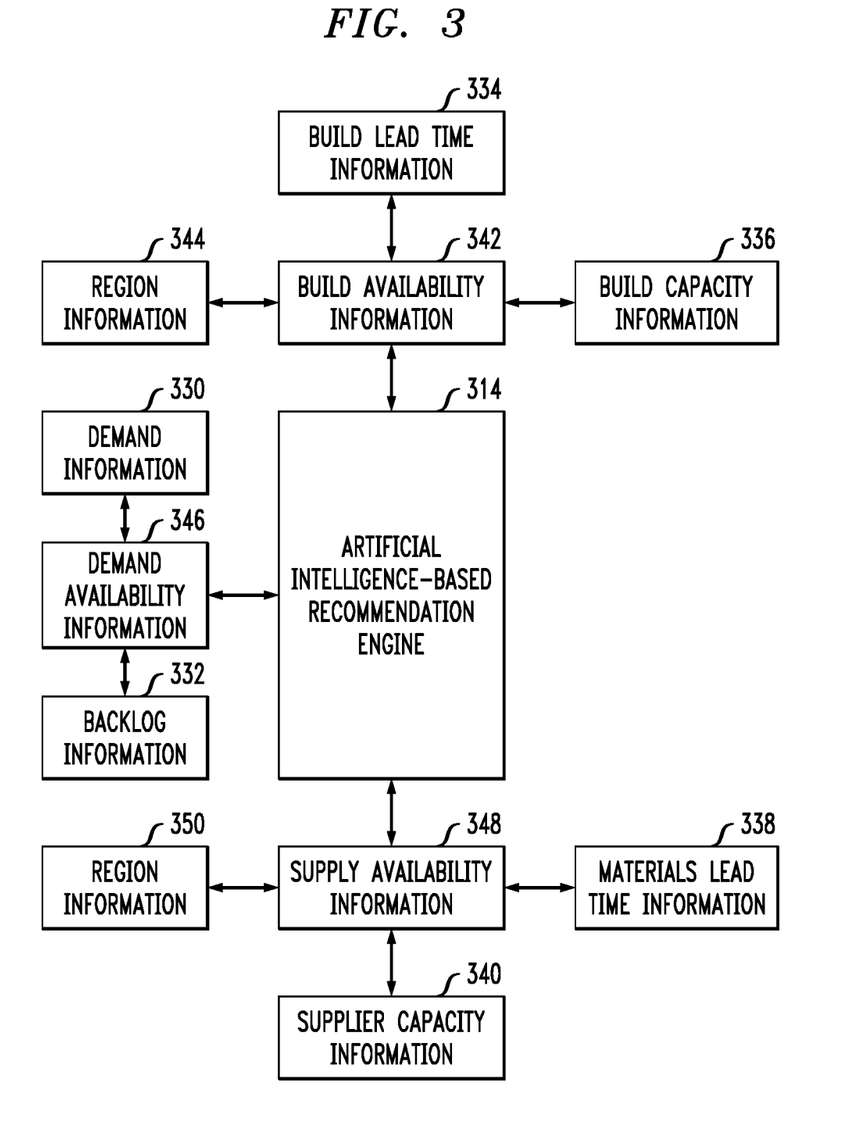
FIG. 3 shows an example workflow in accordance with an illustrative embodiment.

FIG. 3 shows an example workflow in accordance with an illustrative embodiment. By way of illustration, FIG. 3 depicts an example workflow related to generating resource-related scheduling recommendations by processing, using artificial intelligence-based recommendation engine 314, information including demand information 330, backlog information 332, build lead time information 334, build capacity information 336, materials lead time information 338, and supplier capacity information 340. Additionally, and also as depicted in FIG. 3, generating resource-related scheduling recommendations is further based at least in part on intermediate information. Such intermediate information can include build availability information 342, which is based on build lead time information 334, build capacity information 336 and related region information 344. Such intermediate information can also include demand availability information 346, which is based on demand information 330 and backlog information 332. Additionally, such intermediate information can include supply availability information 348, which is based on materials lead time information 338, supplier capacity information 340 and related region information 350. In one or more embodiments, region information 344 and region information 350 can include at least a portion of the same information.

Figure 4:
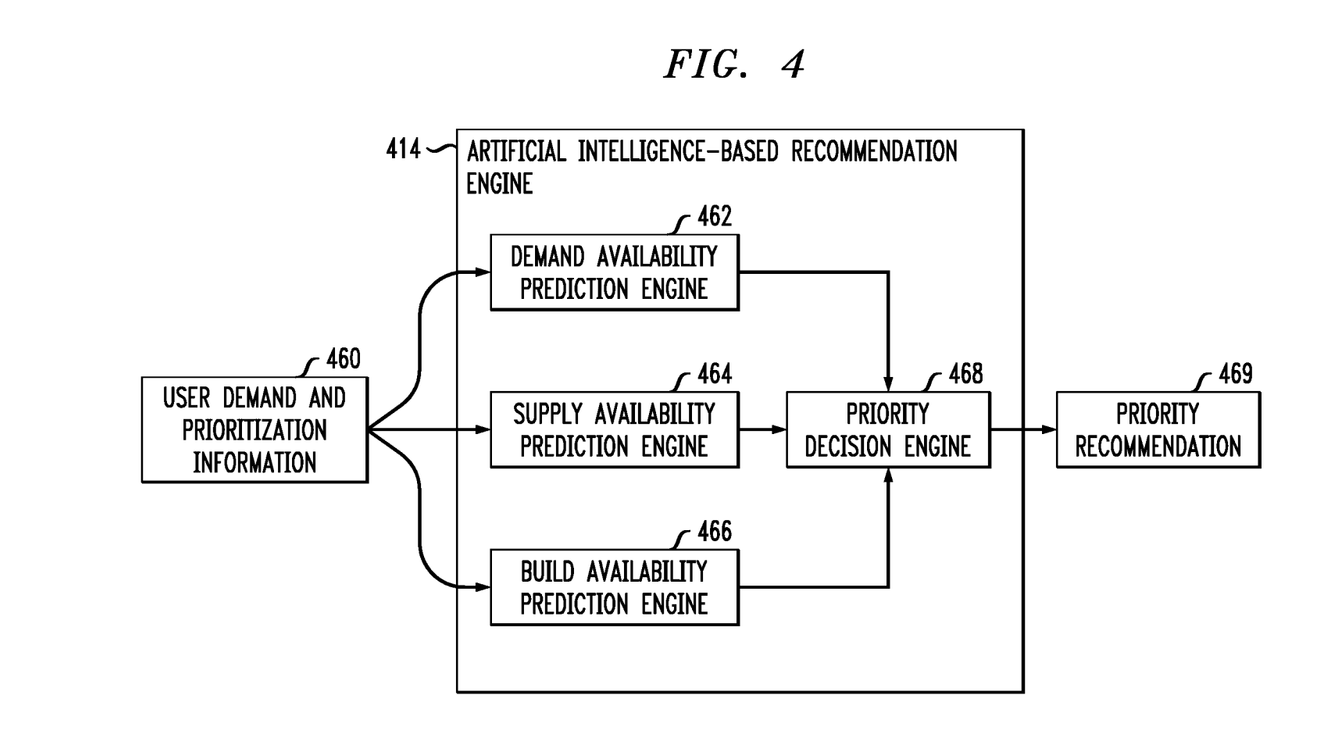
FIG. 4 shows an example workflow in accordance with an illustrative embodiment.

FIG. 4 shows an example workflow in accordance with an illustrative embodiment. As detailed herein, at least one embodiment includes implementing one or more artificial intelligence-based prediction engines which process data pertaining to user readiness including current status information and backlog-related information. Each such prediction engine can be trained in connection with one or more features (e.g., product information, quantity information, estimated time of arrival, etc.) of at least one specific function while classifying resources and/or resource-related transactions into groups of YES or NO for prioritization. In one or more embodiments, classified lists of resources and/or components thereof are generated by the prediction engines, wherein such lists can differ depending upon various attributes (e.g., attributes associated with the particular prediction engine).

With respect to such prediction engines, and referring again to FIG. 4, at least one embodiment includes artificial intelligence-based recommendation engine 414 processing user demand and prioritization information 460. In at least one embodiment, user demand and prioritization information 460 can be based at least in part on relevant demand information, supply information, and build availability information, wherein at least portions of such information can be ranked and prioritized based thereon. More specifically, FIG. 4 depicts an example artificial intelligence-based recommendation engine 414 which contains multiple particular engines therein; namely, a demand availability prediction engine 462, a supply availability prediction engine 464, a build availability prediction engine 466, and a priority decision engine 468. In such an embodiment, demand availability prediction engine 462 depends upon attributes such as, for example, user readiness, required resource components, user and/or supplier geographic region(s), backlog cycle time to classify resource components, etc. Additionally, supply availability prediction engine 464 factors feature attributes such as, for example, resource information, resource component information, supplier information, quantity-related information, etc. Further, build availability prediction engine 466 factors features such as, for example, resource information, sub-assembly information, manufacturing facility information, etc.

In one or more embodiments, classified resources and/or component(s) thereof, classified using the above-noted prediction engines, can differ in terms of which resources and/or resource components are prioritized with respect to one or more users. Additionally, in such an embodiment, the generated lists of classified resources and/or component(s) thereof are then processed by priority decision engine 468, which applies at least one intersection algorithm and one or more additional rules (e.g., including rules related to partial shipments) to create a priority recommendation 469, which includes a final list of prioritized resources and/or resource components to be automatically output to one or more supply chain systems for fulfillment.

In one or more embodiments, such prediction engines as detailed above use at least one deep neural network to build classifiers to predict the priority of one or more resources and/or component(s) thereof. At least a portion of such prediction engines can also process, in parallel, various features that are applicable to the given engine. In at least one embodiment, while there can be some similarity and/or overlap of features between the models of the prediction engines, other features depend upon the domain(s) associated with each given prediction engine. Additionally, in one or more embodiments, the target variable (i.e., the dependent variable) of at least a portion of such models will be the same: the priority of a given resource, the quantity of the given resource, and the suggested delivery date of the given resource.

Figure 5:
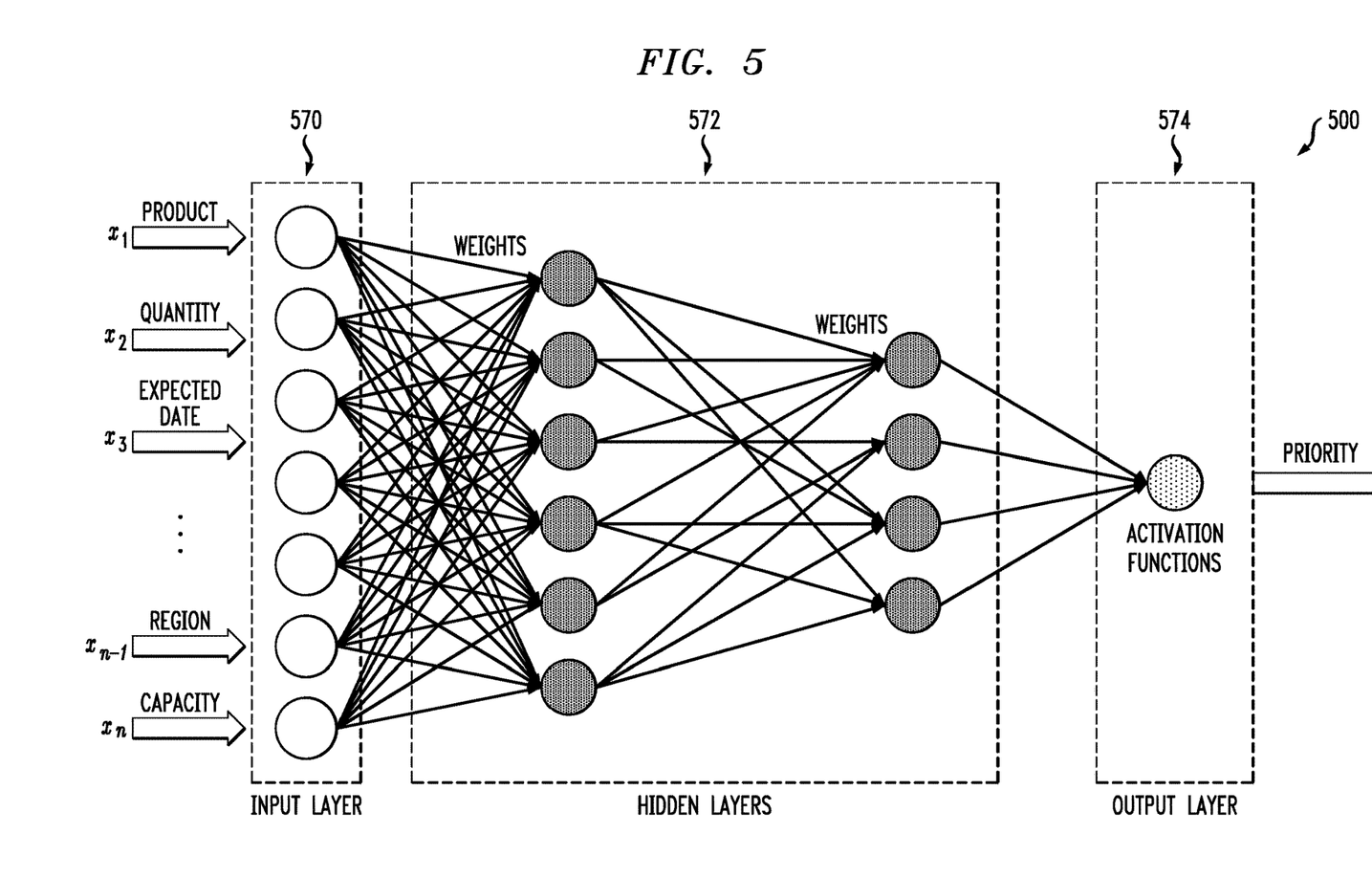
FIG. 5 shows an example neural network implemented in connection with an illustrative embodiment.

FIG. 5 shows an example neural network implemented in connection with an illustrative embodiment. As detailed above and herein, in one or more embodiments, at least one prediction engine makes use of at least one deep neural network by constructing at least one multi-layered neural network that is capable of performing the duties of an advanced classifier. FIG. 5 depicts such a multi-layered neural network 500, which includes an input layer 570, one or more hidden layers 572 (e.g., two hidden layers), and an output layer 574. The number of neurons in the input layer 570 can correspond, for example, to the total number of independent variables being processed by the neural network. As depicted, for example, in FIG. 5, such independent variables can include product information ($x_1$), quantity information ($x_2$), expected date information ($x_3$), region information ($x_{n-1}$) and capacity information ($x_n$).

Also, in at least one embodiment and as depicted in FIG. 5, the hidden layer(s) 572 can be composed of two layers, with the number of neurons on each hidden layer being based at least in part on the total number of neurons in the input layer 570.

Also, with one or more embodiments being directed to a binary classification model, the output layer 574, as depicted in FIG. 5, includes a single neuron. The result (i.e., the output of the output layer 574) can indicate one or more resources and/or component(s) thereof to be prioritized with respect to one or more resource-related actions. In such an embodiment, the output layer 574 can include an activation function (e.g., a sigmoid activation function), facilitating a model used for binary classification by the single neuron that is present in the output layer 574.

In one or more embodiments, the number of neurons in the hidden layer(s) 572 can depend, for example, on the total number of neurons in the input layer 570. In such an embodiment, the number of neurons in the first hidden layer can be calculated based at least in part on an algorithm matching the power of two to the number of input layer neurons. For example, if the number of input layer neurons (which, e.g., can represent the number of input variables) is 19, that number falls in the range of $2^6$, which means that the first hidden layer will have $2^6=64$ neurons. A second hidden layer can then contain, for example, $2^4=16$ neurons. If there is a third hidden layer, such a layer can include $2^3=8$ neurons.

Additionally, as noted above, in one or more embodiments, the neurons in the hidden layer(s) 572 and the output layer 574 can contain at least one activation function that determines if the given neuron will fire or not. By way of example, a rectified linear unit (ReLU) activation function can be used in the hidden layer(s) neurons, and a sigmoid activation function can be used in the output layer neuron(s).

In connection with at least one embodiment, a dense neural network can be implemented, and as such, each neuron in the neural network will connect. Each connection will have a weight factor, and each neuron will have a bias factor. In one or more embodiments, the neural network can randomly set these weight and bias values (e.g., starting as 1 or 0 for all transactions). Each neuron can perform a linear calculation by combining the multiplication of each input variable with their corresponding weight factor(s), and then adding the neuron's bias value. The formula for such a calculation can be represented as follows:

$$ws1 = x1 \cdot w1 + x2 \cdot w2 + \ldots + b1$$

wherein ws1 refers to the weighted sum of neuron1, x1, x2, etc., refer to the input values to the model, w1, w2, etc., refer to the weight values applied to the connections to neuron1, and b1 refers to the bias value of neuron1. This weighted sum is input to an activation function (e.g., ReLU) to compute the value of the activation function. Similarly, the weighted sum and activation function values of all other neurons in the layer are calculated, and these values are fed to the neurons of the next layer. The same process is repeated in the next layer of neurons until the values are fed to the neuron of the output layer, which is where the weighted sum is calculated and compared to the actual target value. Depending upon the difference, a loss value can be calculated.

Such a pass-through of the neural network is referred to as a forward propagation that calculates the loss (also referred to as the error) and drives a backpropagation through the neural network to minimize the loss at each neuron. Considering the loss is generated by all of the neurons in the neural network, backpropagation goes through each layer, from back to front, and attempts to minimize the loss by using at least one gradient descent-based optimization mechanism. Considering that the neural network used in one or more embodiments is a binary classifier, a binary_crossentropy loss function can be used, an adaptive moment estimation (Adam) optimization algorithm and/or RMSProp optimization algorithm can be used, and an accuracy metric can be used.

Such backpropagation can also result in adjusting the weight and bias values at the connection level and neuron level, respectively, to reduce the loss. Additionally, in one or more embodiments, once all observations of the training data are passed through the neural network, an epoch is completed. Another forward propagation is initiated with the adjusted weight and bias values, considered epoch2, and the same process of forward and backpropagation is repeated in one or more subsequent epochs. This process of repeating epochs reduces the loss to a number close to 0, at which point the neural network is sufficiently trained for prediction.

As detailed herein, at least one embodiment includes implementing a demand priority decision engine, which merges the predictions generated by the different prediction engines (e.g., demand availability prediction engine, supply availability prediction engine, and build availability prediction engine) and constructs a final list of transactions and/or resources in a given order of priority for one or more resource-related actions (e.g., manufacture, shipment, delivery, etc.). The transactions and/or resources that are given the highest priority are determined by the demand priority decision engine through the use of at least one intersection algorithm.

Even if all of the different prediction engines (e.g., demand availability prediction engine, supply availability prediction engine, and build availability prediction engine) take the same list of transactions (e.g., orders) as input, the engines' outputs may assign different priorities to the items in the list, as each prediction engine can make use of characteristics that are unique to its field(s). As noted above, the final prioritized list of orders (for example, identifying one or more resources, quantity thereof, and delivery date(s)) is constructed by a demand priority decision engine through the use of at least one intersection algorithm and one or more user-defined rules.

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations and/or predictions. For example, one or more of the models described herein may be trained to generate recommendations and/or predictions related to scheduling resource-related actions (e.g., manufacture, shipment, delivery, etc.) based on relevant demand-related data, supply-related data, availability and/or readiness information, and/or capacity planning data collected from various systems and/or entities, and such recommendations and/or predictions can be used to initiate one or more automated actions (e.g., automatically adjusting one or more resource-related workflows pertaining to manufacturing, shipment, delivery, etc.).

Figure 6:
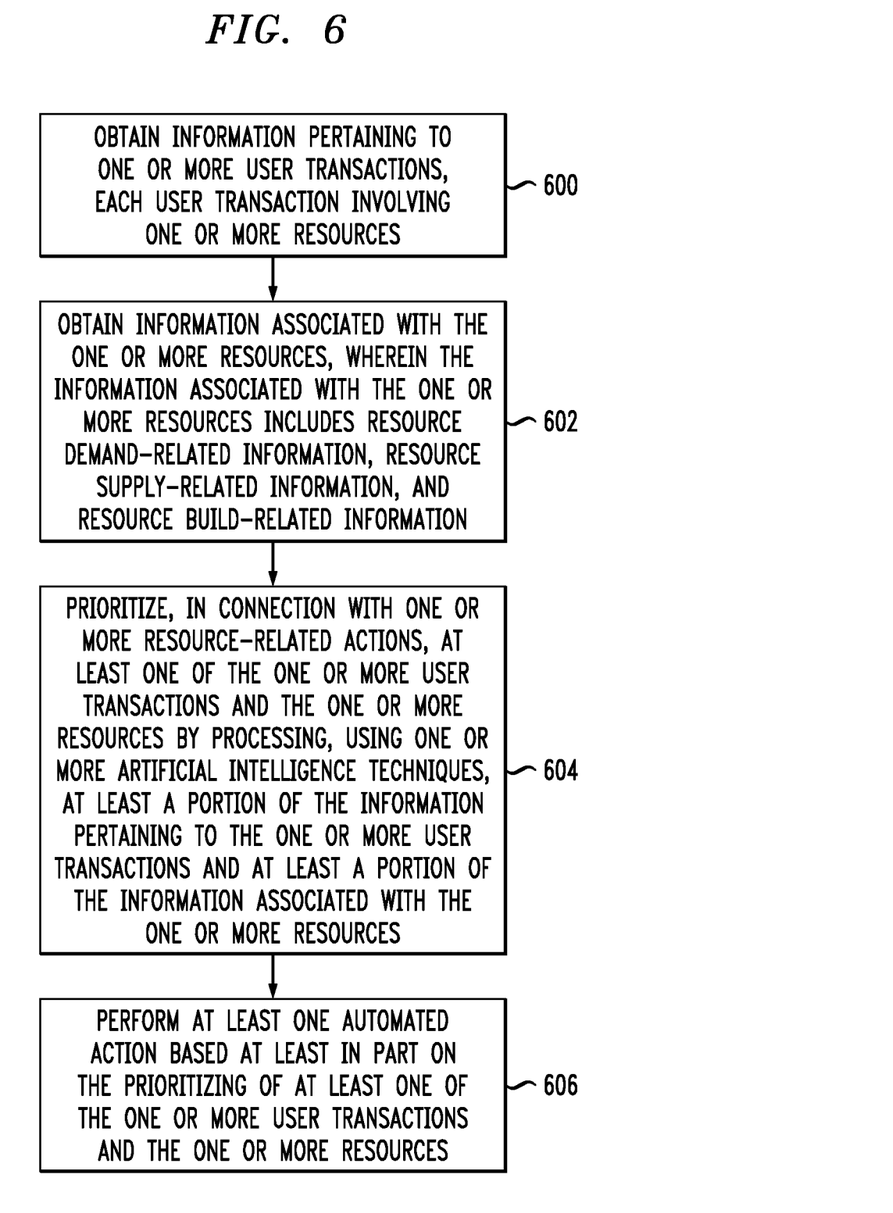
FIG. 6 is a flow diagram of a process for automated resource prioritization using artificial intelligence techniques in an illustrative embodiment.

FIG. 6 is a flow diagram of a process for automated resource scheduling using artificial intelligence techniques in an illustrative embodiment. It is to be understood that this particular process is only an example, and additional or alternative processes can be carried out in other embodiments.

In this embodiment, the process includes steps 600 through 606. These steps are assumed to be performed by automated resource prioritization system 105 utilizing elements 112, 114 and 116. Step 600 includes obtaining information pertaining to one or more user transactions, each user transaction involving one or more resources. In at least one embodiment, obtaining information pertaining one or more user transactions includes dividing the information pertaining to the one or more user transactions based at least in part on a prioritization of related user objectives.

Step 602 includes obtaining information associated with the one or more resources, wherein the information associated with the one or more resources comprises resource demand-related information, resource supply-related information, and resource build-related information. In one or more embodiments, the resource demand-related information is based at least in part on user capacity planning information, the resource supply-related information is based at least in part on supplier capacity information, region-related information, and materials lead time information, and the resource build-related information is based at least in part on build capacity information, region-related information, and build lead time information.

Step 604 includes prioritizing, in connection with one or more resource-related actions, at least one of the one or more user transactions and the one or more resources by processing, using one or more artificial intelligence techniques, at least a portion of the information pertaining to the one or more user transactions and at least a portion of the information associated with the one or more resources. In at least one embodiment, prioritizing the one or more resources includes using the one or more artificial intelligence techniques in conjunction with at least one intersection algorithm. Also, prioritizing the one or more resources using one or more artificial intelligence techniques can include using at least one deep neural network to build one or more prioritization classifiers. Further, prioritizing the one or more resources using one or more artificial intelligence techniques can include using one or more ensemble-based techniques in connection with multiple federated machine learning models.

Additionally or alternatively, prioritizing the one or more resources can include determining, for each of the one or more resources, a confidence level associated with successful completion of at least a portion of the one or more resource-related actions in each of one or more temporal periods. In such an embodiment, prioritizing the one or more resources includes arranging each of the one or more resources in accordance with the determined confidence levels.

Step 606 includes performing at least one automated action based at least in part on the prioritizing of at least one of the one or more user transactions and the one or more resources. In one or more embodiments, performing at least one automated action includes generating and outputting at least one list of the one or more resource-related actions, ordered in accordance with two or more temporal periods and the prioritizing of at least one of the one or more user transactions and the one or more resources. Also, performing at least one automated action can include reserving one or more materials related to at least a portion of the one or more resources, wherein reserving the one or more materials is based at least in part on the prioritizing of at least one of the one or more user transactions and the one or more resources. Additionally or alternatively, performing at least one automated action can include automatically training at least a portion of the one or more artificial intelligence techniques based at least in part on feedback related to the prioritizing of at least one of the one or more user transactions and the one or more resources.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to perform automated resource scheduling using artificial intelligence techniques. These and other embodiments can effectively overcome problems associated with user dissatisfaction and increased costs.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
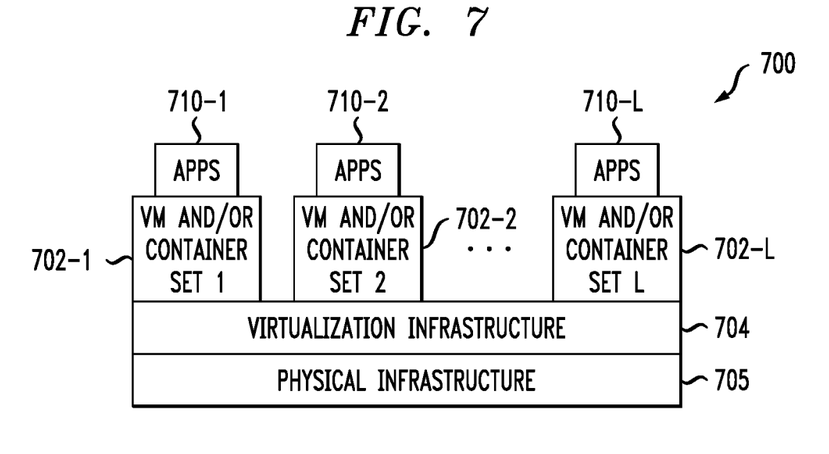
FIGS. 7 and 8 show examples of processing platforms that may be utilized to implement at least a portion of an information processing system in illustrative embodiments.
Figure 8:
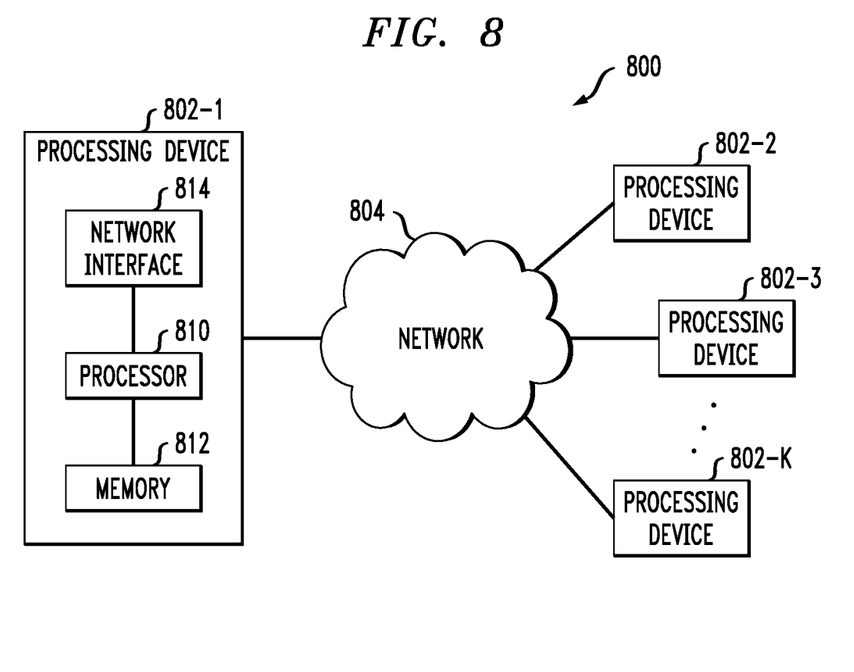

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more information processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a CPU, a GPU, a TPU, a microcontroller, an ASIC, a FPGA or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining information pertaining to one or more user transactions, each user transaction involving one or more resources;
   obtaining information associated with the one or more resources, wherein the information associated with the one or more resources comprises resource demand-related information, resource supply-related information, and resource build-related information;
   prioritizing, in connection with one or more resource-related actions, at least one of the one or more user transactions and the one or more resources by processing, using one or more artificial intelligence techniques, at least a portion of the information pertaining to the one or more user transactions and at least a portion of the information associated with the one or more resources; and
   performing at least one automated action based at least in part on the prioritizing of at least one of the one or more user transactions and the one or more resources, wherein performing at least one automated action comprises automatically training at least a portion of the one or more artificial intelligence techniques based at least in part on feedback related to the prioritizing of at least one of the one or more user transactions and the one or more resources;
   wherein the method is performed by at least one processing device comprising a processor coupled to a memory.

2. The computer-implemented method of claim 1, wherein prioritizing the one or more resources comprises using the one or more artificial intelligence techniques in conjunction with at least one intersection algorithm.

3. The computer-implemented method of claim 1, wherein prioritizing the one or more resources using one or more artificial intelligence techniques comprises using at least one deep neural network to build one or more prioritization classifiers.

4. The computer-implemented method of claim 1, wherein prioritizing the one or more resources using one or more artificial intelligence techniques comprises using one or more ensemble-based techniques in connection with multiple federated machine learning models.

5. The computer-implemented method of claim 1, wherein prioritizing the one or more resources comprises determining, for each of the one or more resources, a confidence level associated with successful completion of at least a portion of the one or more resource-related actions in each of one or more temporal periods, and wherein prioritizing the one or more resources comprises arranging each of the one or more resources in accordance with the determined confidence levels.

6. The computer-implemented method of claim 1, wherein performing at least one automated action comprises generating and outputting at least one list of the one or more resource-related actions, ordered in accordance with two or more temporal periods and the prioritizing of at least one of the one or more user transactions and the one or more resources.

7. The computer-implemented method of claim 1, wherein performing at least one automated action comprises reserving one or more materials related to at least a portion of the one or more resources, wherein reserving the one or more materials is based at least in part on the prioritizing of at least one of the one or more user transactions and the one or more resources.

8. The computer-implemented method of claim 1, wherein obtaining information pertaining one or more user transactions comprises dividing the information pertaining to the one or more user transactions based at least in part on a prioritization of related user objectives.

9. The computer-implemented method of claim 1, wherein the resource demand-related information is based at least in part on user capacity planning information.

10. The computer-implemented method of claim 1, wherein the resource supply-related information is based at least in part on supplier capacity information, region-related information, and materials lead time information.

11. The computer-implemented method of claim 1, wherein the resource build-related information is based at least in part on build capacity information, region-related information, and build lead time information.

12. A computer-implemented method comprising:
   obtaining information pertaining to one or more user transactions, each user transaction involving one or more resources;
   obtaining information associated with the one or more resources, wherein the information associated with the one or more resources comprises resource demand-related information, resource supply-related information, and resource build-related information;
   prioritizing, in connection with one or more resource-related actions, at least one of the one or more user transactions and the one or more resources by processing, using one or more artificial intelligence techniques, at least a portion of the information pertaining to the one or more user transactions and at least a portion of the information associated with the one or more resources, wherein prioritizing the one or more resources comprises determining, for each of the one or more resources, a confidence level associated with successful completion of at least a portion of the one or more resource-related actions in each of one or more temporal periods; and
   performing at least one automated action based at least in part on the prioritizing of at least one of the one or more user transactions and the one or more resources;

wherein the method is performed by at least one processing device comprising a processor coupled to a memory.

13. A non-transitory processor-readable storage medium having stored therein program code of one or more software programs, wherein the program code when executed by at least one processing device causes the at least one processing device:

to obtain information pertaining to one or more user transactions, each user transaction involving one or more resources;

to obtain information associated with the one or more resources, wherein the information associated with the one or more resources comprises resource demand-related information, resource supply-related information, and resource build-related information;

to prioritize, in connection with one or more resource-related actions, at least one of the one or more user transactions and the one or more resources by processing, using one or more artificial intelligence techniques, at least a portion of the information pertaining to the one or more user transactions and at least a portion of the information associated with the one or more resources; and to perform at least one automated action based at least in part on the prioritizing of at least one of the one or more user transactions and the one or more resources, wherein performing at least one automated action comprises automatically training at least a portion of the one or more artificial intelligence techniques based at least in part on feedback related to the prioritizing of at least one of the one or more user transactions and the one or more resources.

14. The non-transitory processor-readable storage medium of claim 13, wherein prioritizing the one or more resources comprises using the one or more artificial intelligence techniques in conjunction with at least one intersection algorithm.

15. The non-transitory processor-readable storage medium of claim 13, wherein prioritizing the one or more resources using one or more artificial intelligence techniques comprises using at least one deep neural network to build one or more prioritization classifiers.

16. The non-transitory processor-readable storage medium of claim 13, wherein prioritizing the one or more resources using one or more artificial intelligence techniques comprises using one or more ensemble-based techniques in connection with multiple federated machine learning models.

17. An apparatus comprising:

at least one processing device comprising a processor coupled to a memory;

the at least one processing device being configured:

to obtain information pertaining to one or more user transactions, each user transaction involving one or more resources;

to obtain information associated with the one or more resources, wherein the information associated with the one or more resources comprises resource demand-related information, resource supply-related information, and resource build-related information;

to prioritize, in connection with one or more resource-related actions, at least one of the one or more user transactions and the one or more resources by processing, using one or more artificial intelligence techniques, at least a portion of the information pertaining to the one or more user transactions and at least a portion of the information associated with the one or more resources; and to perform at least one automated action based at least in part on the prioritizing of at least one of the one or more user transactions and the one or more resources, wherein performing at least one automated action comprises automatically training at least a portion of the one or more artificial intelligence techniques based at least in part on feedback related to the prioritizing of at least one of the one or more user transactions and the one or more resources.

18. The apparatus of claim 17, wherein prioritizing the one or more resources comprises using the one or more artificial intelligence techniques in conjunction with at least one intersection algorithm.

19. The apparatus of claim 17, wherein prioritizing the one or more resources using one or more artificial intelligence techniques comprises using at least one deep neural network to build one or more prioritization classifiers.

20. The apparatus of claim 17, wherein prioritizing the one or more resources using one or more artificial intelligence techniques comprises using one or more ensemble-based techniques in connection with multiple federated machine learning models.

\* \* \* \* \*